United States Patent [19]

Yamanashi

[11] 4,141,518

[45] Feb. 27, 1979

[54] SAFETY-BELT RETRACTOR

[75] Inventor: Chusaku Yamanashi, Kasai, Japan

[73] Assignee: Fuji Kiko Kabushiki Kaisha, Tokyo, Japan

[21] Appl. No.: 624,827

[22] Filed: Oct. 22, 1975

[30] Foreign Application Priority Data

Oct. 21, 1974 [JP] Japan .................. 49-121204
Oct. 22, 1974 [JP] Japan .................. 49-121730
Oct. 22, 1974 [JP] Japan .................. 49-121731

[51] Int. Cl.² .................. A62B 35/02; B65H 75/48
[52] U.S. Cl. .................. 242/107.4 A; 242/107.4 B
[58] Field of Search .................. 242/107.4 A, 107.4 B; 297/388; 280/744

[56] References Cited

U.S. PATENT DOCUMENTS

| | | | |
|---|---|---|---|
| 3,446,454 | 5/1969 | Kovacs et al. | 242/107.4 B |
| 3,450,368 | 6/1969 | Glauser et al. | 242/107.4 B |
| 3,552,676 | 1/1971 | Weber | 242/107.4 A |
| 3,758,044 | 9/1973 | Nilsson | 242/107.4 A |
| 3,819,126 | 6/1974 | Stoffel | 242/107.4 BX |
| 3,901,459 | 8/1975 | Romanzi | 242/107.4 A |
| 3,917,189 | 11/1975 | Bryll | 242/107.4 B |
| 3,918,658 | 11/1975 | Beller | 242/107.4 BX |

*Primary Examiner*—Harvey C. Hornsby
*Assistant Examiner*—John M. Jillions
*Attorney, Agent, or Firm*—Haseltine, Lake & Waters

[57] ABSTRACT

A safety-belt retractor for use in vehicles comprising a take-up mechanism for taking up a safety-belt, and a locking mechanism for which is used to prevent pulling-out of the safety-belt. A clutch mechanism acts, in the running condition of the vehicle, to render the locking mechanism inactive, while, in an emergency condition of the vehicle, it activates the locking mechanism. An emergency detector provided with an inertia disk enables the clutch mechanism to connect with the locking mechanism in response to the action of the inertia disk in the emergency condition.

8 Claims, 13 Drawing Figures

FIG. 9

SAFETY-BELT RETRACTOR

FIELD OF THE INVENTION

The present invention relates to a safety-belt retractor for use in vehicles and, more particularly, to one allowing a safety-belt to be smoothly fed out in a normal running condition of the vehicle while reliably locking the feeding-out or the release of the safety-belt in an emergency condition of the vehicle.

DESCRIPTION OF THE PRIOR ART

With the recent remarkable prevalence in the use of automobiles, they have become necessary instruments in our lives. Extended highways also provide an efficient utilization of the automobiles while at the same time causing automobile accidents to be more dangerous due largely to the high speed travel.

In automobile accidents involving rapid deceleration the driver and passenger can be thrown forwardly against the front wind shield or the dashboard or can receive impact against the chest by colliding with the steering wheel.

For prevention of such accidents, it is necessary to fasten the occupant in the vehicle seat in order that he will not move forwards out of the vehicle seat.

Known passenger fastening devices are, for example, a two-point fixing type safety-belt device, a three-point fixing safety-belt device, a harness (four-point) type safety-belt device and the like.

Generally, these safety-belts lay in a loose fashion across the seat or are intertwined so that the safety-belts are a nuisance in use and are attractive when not in use. For overcoming this, various improvements have been made in safety-belt devices. In one of these improved devices, the safety-belt is stored out of sight when not in actual use while it is pulled out of the belt storing means, or a belt-retractor, for securing the passenger in the seat when in actual use. The belt is automatically retracted by its take-up function. In the belt-retractor must be designed so that, when an automobile accident occurs, the safety-belt is locked its feeding out operation so as to prevent the passenger from moving forward from the seat. Therefore, a conventional safety-belt retractor is constructed such that, in the normal running condition of the vehicle, the safety-belt may smoothly be fed out while, in an emergency condition of the vehicle, for example, when the vehicle abruptly stops, the releasing operation of the safety-belt is locked by gearing a ratchet pawl with a ratchet wheel. The thus constructed safety-belt retractor, however, has a problem in that the tips of the teeth on these parts frequently collide with each other and sometimes teeth jumping can occur.

SUMMARY OF THE INVENTION

Accordingly, an object of the present invention is to provide a safety-belt retractor in which, in the normal running condition, the safety-belt is smoothly fed out without any resistance while, in the emergency condition, it is reliably locked against feeding out. Thus, in use the passenger may quickly put on the safety belt and is prevented from moving forward from the seat thereby providing a safety for the passenger.

Another object of the present invention is to provide a safety-belt retractor provided with an upstanding member which quickly inclines in response to an abrupt change of the vehicle speed or an inclination of the vehicle body to lock the retractor and insure the safety of the passenger.

According to one aspect of the present invention, there is provided a safety-belt retractor for use in vehicles, comprising (a) a locking mechanism provided in a take-up mechanism for taking up a safety-belt, which is used to lock the pulling-out of the safety belt, (b) a clutch mechanism which, in a normal running condition of the vehicle, acts to make the locking mechanism inactive, while, in an emergency condition, for example, when the vehicle suddenly stops or the vehicle inclines, acts to make the locking mechanism active, and (c) an emergency detector provided with an inertia disk which enables the clutch mechanism to connect with the locking mechanism in response to the temporary immovability of the inertial disk due to its inertia in the emergency condition.

The locking mechanism includes a first ratchet wheel fixedly mounted on a shaft and a first and a second ratchet pawl which are angularly disposed at a predetermined angle, the first ratchet pawl being so arranged as to engage with the first ratchet wheel.

The clutch mechanism includes a clutch plate rotatably mounted on the shaft which is provided on its periphery with a pair of projections which receives the second pawl therebetween and on its side wall with a pair of further pawls, a screw means fixedly mounted on the shaft and having an external thread, a second ratchet wheel having an internal thread through which the second ratchet wheel is loosely fitted around the external thread of the screw member so as to rotatably slide along the external thread, the ratchet wheel engages the pair of pawls of the clutch plate in the emergency condition, a spring means disposed between the clutch plate and the second ratchet wheel and which acts to separate the clutch plate from the second ratchet wheel in the normal condition.

The inertia disk of the emergency detector is slidably coupled with the second ratchet wheel.

The above and other objects and advantages inherent to this invention will be apparent from the following description, taken in connection with accompanying drawings, in which:

DESCRIPTION OF THE PREFERRED EMBODIMENTS

Figure 1:
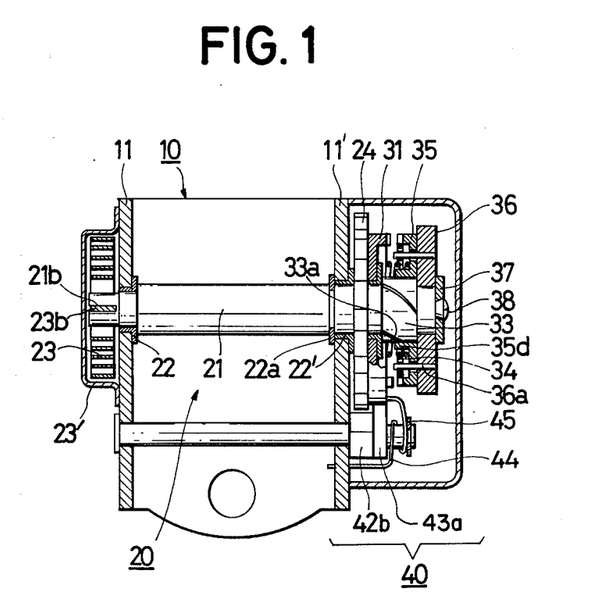
FIG. 1 shows a vertical sectional view of a safety-belt retractor of an embodiment according to the present invention.
Figure 2A:
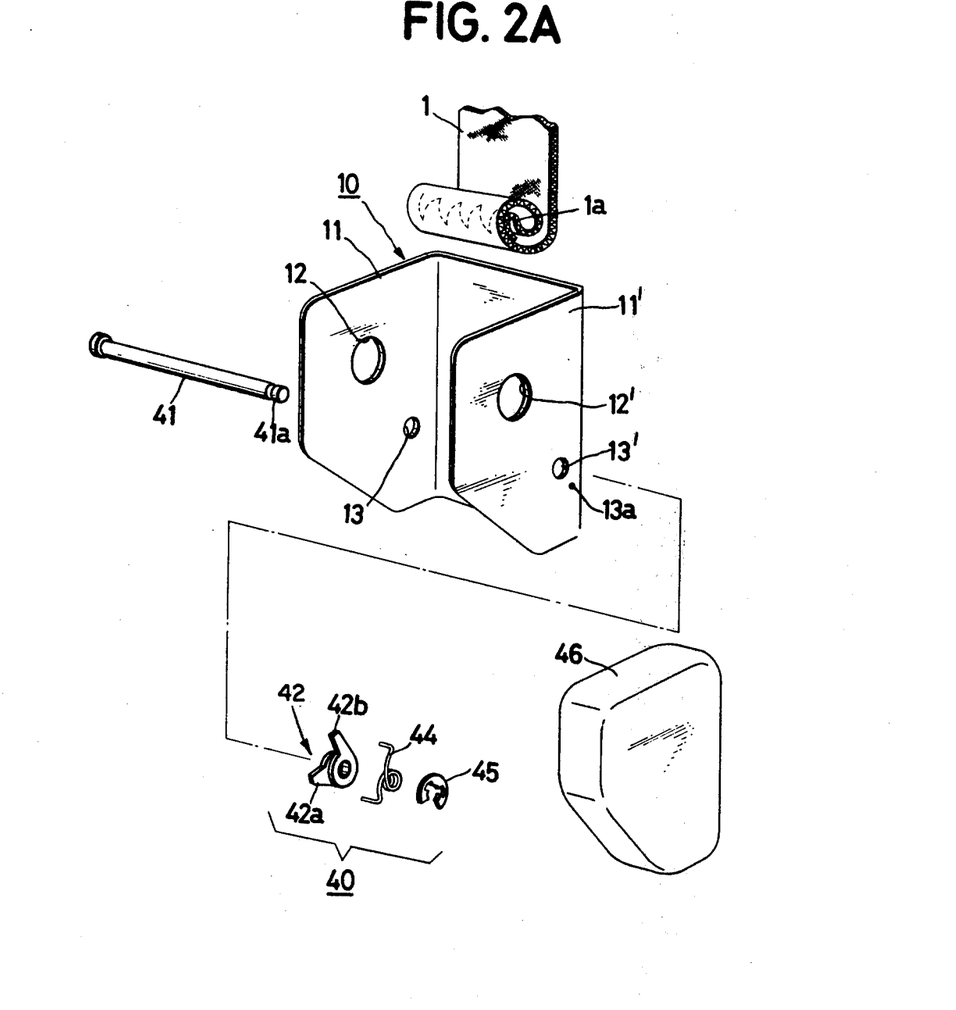
FIG. 2A and 2B cooperate to form a complete drawing in an exploded view of the safety-belt retractor of FIG. 1, FIGS. 3A, 3B and 3C are a series of views illustrating the successive operation of locking the feed-out of a safety-belt.
Figure 2B:
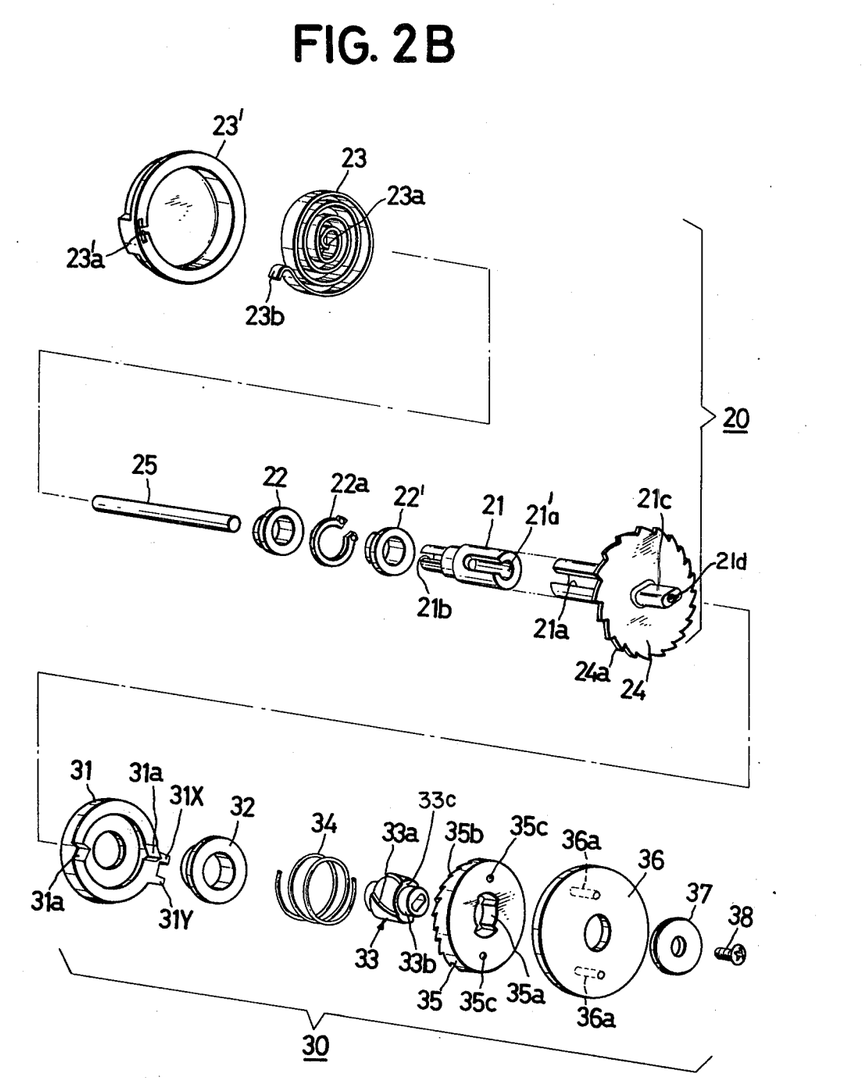

For a general understanding of a safety-belt retractor according to the present invention, reference is had to FIGS. 1 and 2 which depict schematically the various components thereof. Throughout this description, like reference numerals will be used to designate like portions.

As seen from the figures, a frame of the belt-retractor as indicated by reference numeral 10 is of U-shape and has two support walls 11 and 11' each having large and small openings 12, 13, 12' and 13'.

A take-up mechanism generally indicated by 20 is supported between the support wall 11 and 11' of the frame 10. The take-up mechanism 20 automatically takes up or retracts a safety-belt 1 when it is not in use while permitting the safety belt to be smoothly fed out when a passenger wants to put it on. In the take-up mechanism 20, a shaft 21 is inserted at one end into one opening 12 of the corresponding support wall 11 through a bush 22 while at the other end into the other opening 12' through another bush 22' and it is also provided at this end with a snap ring 22a for preventing the shaft from slipping off. The shaft 21 has a slit 21b in the axial direction at one end into which an inner hooked end 23a of a spiral spring 23 is inserted. An elongated slit 21a is formed in the axial direction for receiving base end 1a of the webbing 1. The outer hooked end 23b of spiral spring 23 is engaged in a slit 23'a formed on the inner surface of a dust cover 23'. The dust cover 23' covers the spiral spring 23 for protecting it from dust contamination or damage from unexpected external force applied thereto. As noted, the base end 1a of the belt 1 is inserted into the slit 21a and a bar 25 is inserted into a bore 21'a in shaft 21 thereby securing the base end 1a of the belt 1 thereto. A ratchet wheel 24 is mounted on a squared end 21c of the shaft 21 which projects outwardly from the support wall 11'. Teeth 24a angularly formed on the periphery of the ratchet wheel 24 are so shaped to permit its rotary motion in one direction only. The spiral spring 23 acts at all times to retract the safety belt. The squared end 21c has on its end face a threaded hole 21d for receiving a machine screw 38 to be referred to later.

Mounted on the squared end 21c are the ratchet wheel 24, a clutch plate 31, a bush 32 serving as a spacer, a coil spring 34, a screw member 33, another ratchet wheel 35, an inertia disk 36, a washer 37, and the machine screw 38. These components substantially constitute a clutch mechanism 30. The clutch mechanism 30 coacts with a pawl mechanism 40 to be described later in detail to prevent the belt 1 from being fed out when the vehicle suddenly stops. More precisely, in such a case, the clutch mechanism 30 detects a sudden and forcible protraction applied to the belt, and drives the pawl mechanism 40 which in turn engages one of the teeth of the ratchet wheel 24 which is fixedly mounted on the shaft 21 thereby to reliably lock the ratchet wheel 24 and hence the feed-out of the belt 1. The clutch plate 31 is rotatably mounted on the squared end 21c, adjacent to the clutch wheel 24. The clutch plate 31 has a pair of projections 31X and 31Y on the periphery, and further is provided with a pair of pawls 31a on the radially outer side of the wall of the clutch plate and directed toward the teeth of the ratchet wheel 35. As will be described later, these pawls 31a engage with the teeth 35b of the ratchet wheel 35 when the vehicle suddenly stops. The spacer 32 is disposed between the ratchet wheel 24 and the screw member 33. The spacer 32 is used to prevent application of the thrust load of the spring member 34 against the clutch plate 31 when a rapid deceleration of the vehicle takes place. The spacer 32 also serves as an axle of the clutch plate 31. The coil spring 34 is disposed around the screw member 33 and bears at one end against the spacer 32 and at the other end against the side wall of the ratchet wheel 35 as shown in FIG. 1. The spring 34 normally biases the ratchet wheel 35 to the right as viewed in the drawing. Accordingly, the clutch plate 31 is spaced from the ratchet wheel 35 in the normal running condition of the vehicle. The screw member 33 is comprised of a boss 33b and an external thread 33a having a large lead angle around the boss 33b. An internal thread 35a is formed at the center of the ratchet wheel 35 which also is provided with a pair of holes 35c in the wall. The ratchet wheel 35 is relatively loosely fitted around the external thread 33a of the screw member 33 through the internal thread 35a. The inertia disk 36 is rotatably fitted around the boss 33b as shown in FIG. 1. A pair of guide pins 36a fixed to the side wall of the inertia disk 36 are aligned with the holes 35c in the ratchet wheel 35, and, when assembled, is slidably inserted into the holes 35c. The inertia disk 36 is rotatable around the boss 33b but is not shiftable along the axis because the inertia disk 36 abuts at one side on the shoulder 33c of the external screw 33a when it shifts toward the ratchet wheel 35 while it abuts at the other side against washer 37 when it shifts in the opposite direction. The machine screw 38 is engaged in the threaded hole 21d through the washer 37 for preventing the inertia disk 36 from slipping off the squared end 21c. As just mentioned, the washer 37 is fitted on the end face of the squared end 21d by means of the set screw 38 so as to prevent shift of the inertia disk along the axis but permitting rotation of the inertia disk around the boss 33b.

Turning now to the pawl mechanism 40, it will be seen that this mechanism is comprised of a rod 41, a pawl 42 including a pair of angularly spaced pawls 42a and 42b, a spring 44, and a fixing ring 45. The pawl 42 is rotatably fitted around an end of the rod 41 protruding from the support wall 11'. The spring 44 disposed adjacent to the pawls 42a and 42b bears at one end against the pawl 42b and is inserted at the other end into a small hole 13a drilled in the support wall 11'. The spring 44 normally biases the pawls 42a and 42b such that the pawl 42b is placed between the projection 31X and 31Y while the pawl 42a is detached from the teeth 24a angularly arranged on the periphery of the ratchet wheel 24.

The operation of the safety-belt retractor will now be described. When a passenger pulls the safety belt 1 to put it on, the belt is fed relatively slowly out of the retractor, i.e., the take-up shaft 21 rotates at a relatively low speed. Accordingly, the screw member 33 fixedly mounted on the take-up shaft 21 rotates together with the inertia plate 36 so that the ratchet wheel 35 cooperating with the inertia plate 36 through the guide pins 36a rotates in synchronism with the screw member 33. Therefore, the ratchet wheel 35 does not shift in the axial direction. Thus, in this condition, the clutch mechanism 30 is ineffective to permit the belt 1 to be freely released or taken up. If the vehicle suddenly stops, the belt 1 is rapidly pulled out, that is, the shaft 21 with the webbing 1 is rapidly rotated in the webbing releasing direction. At this time, the screw member 33 on the take-up shaft 21 also tends to rotate rapidly while the inertia disk 36 is still immovable due to its large inertia and thus the ratchet wheel 35 is shifted toward the clutch plate 31 along the guide pins 36a and the external thread on member 33.

This shift of the ratchet wheel 35 continues until the end face of the boss 35d of ratchet wheel 35 (FIG. 1) comes in contact with the spacer 32. With this shift, the teeth 35b of the ratchet wheel 35 approach the pawls 31a of the clutch plate 31 to such an extent that the teeth 35b can possibly mesh with the latter. However, these pawls are not in mesh with the teeth, if these are disposed in a different phase. With further progression of the pulling of the belt 1, the take-up shaft 21 continues to rotate further. On the other hand, the ratchet wheel 35 is prevented from shifting axially since the boss 35d of the ratchet wheel 35 abuts against the spacer 32. Thus, the ratchet wheel 35, together with the screw member 33, rotate in the same direction as that of the take-up shaft 21 so that the pawls 31a of the clutch plate 31 completely engage with the corresponding teeth 35b of the ratchet wheel 35. As a result, all of these components, i.e., the take-up shaft 21, the clutch plate 31 and the ratchet wheel 35, rotate as a unit.

Figure 3A:
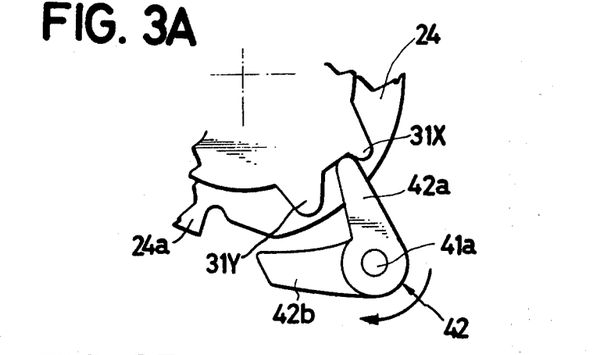
Figure 3B:
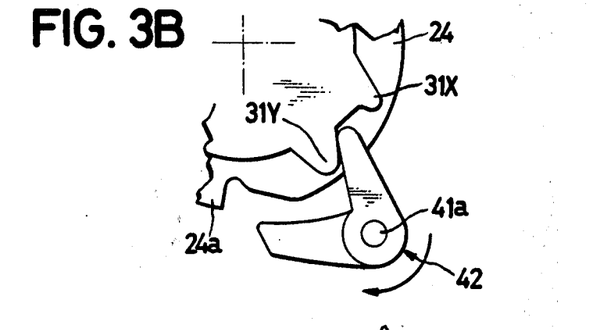
Figure 3C:
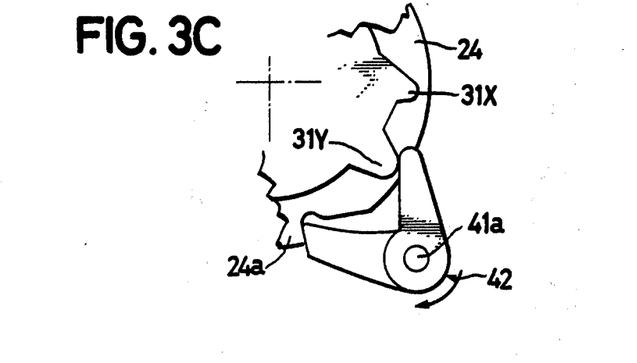

FIGS. 3a to 3c illustrate the sequence of the operation of the pawl mechanism 40.

In such a unitary rotation, the projection 31X moves to detach from the pawl 42a (FIG. 3a) and then the projection 31Y comes into contact with the pawl 42a thereby to turn the pawl member 42 in the direction of the arrow (FIG. 3b). Finally, the pawl 42b turns to mesh with the teeth 24a, thus resulting in locking in rotation the take-up shaft 21 in the belt release direction (FIG. 3c). As seen from the foregoing description, in the operation in FIGS. 3a, b, and c, the clutch plate 31 is disposed relative to the ratchet wheel 24 in a fixed angular relation. Therefore, if the pawl member 42 with the angularly spaced pawls 42a and 42b is appropriately shaped in relation to the teeth of the ratchet wheel 24 and the projections 31X and 31Y, the rotation of the ratchet wheel 24 may be angularly fixed relative to that of the ratchet pawl 42b thereby to ensure the engagement of the ratchet pawl 42b with one of the teeth 24a of the ratchet wheel 24. Thus, with such an arrangement, a disadvantageous situation is avoided e.g., the tooth crests of the teeth 24a contact the top of the pawl 42b thereby failing to engage the ratchet pawl 42b with one of the teeth 24a.

As seen from the foregoing, in an emergency locking, the movement of the ratchet wheel is made in synchronism with that of the ratchet pawl through the action of the clutch mechanism. As a result, the ratchet pawl is smoothly engaged with the ratchet wheel and thus this part of the device is strengthened. Further, the ratchet pawl is precisely brought into mesh with the ratchet wheel so that in a sudden deceleration of the vehicle, the safety belt is stably fed-out.

Figure 4:
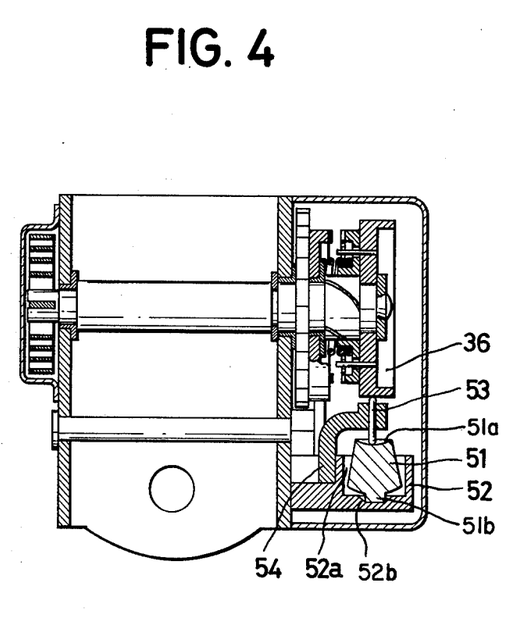
FIG. 4 is a vertical sectional view of another embodiment of the belt-retractor according to the present invention in which an auxiliary locking mechanism is employed.
Figure 5:
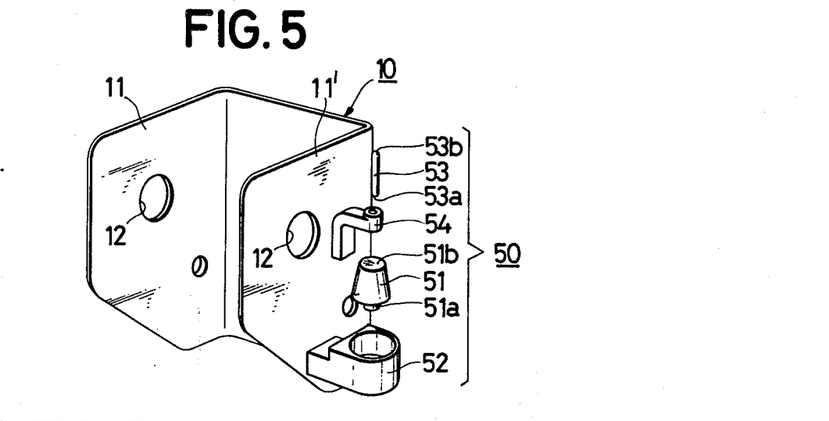
FIG. 5 is an exploded view of the auxiliary locking mechanism which is employed in the safety-belt retractor of FIG. 4.

Turning now to FIGS. 4 and 5 there is shown another embodiment of a safety-belt retractor according to the present invention, in which an auxiliary locking mechanism 50 is employed. The auxiliary locking mechanism 50 is comprised of an upstanding member 51, a holder 52 for movably holding the upstanding member 51, a rod-like member 52 whose lower end 53a contacts the top end 51b of member 51, and a support member 54 for slidably supporting the rod-like member 53. The holder 52 fixed on the support wall 11' and has a stepped bore 52a for receiving the upstanding member 51, The upstanding member 51 is provided at its bottom with a projection 51a and its top end 51b is curved and has a smoothed surface. The upstanding member 51 is movably supported in the stepped bore 52a by engagement of the projection 51a in recess 52b at the bottom of the bore 52a. The lower end 53a of the rod-like member 53 is slidably seated in the center of the curved top end 51b of upstanding member 51 in the normal running condition of the vehicle. At the same time, the top end 53b of the rod-like member 53 is slightly spaced from the peripheral surface of the inertia plate 36 thereby to permit the inertia plate 36 to freely rotate. When the vehicle is suddenly decelerated or the vehicle body is inclined, the upstanding member 51 inclines so that the rod-like member slides up on the smooth curved surface at the top end 51b of the upstanding member and it is pressed against the peripheral surface of the inertia plate 36 thereby to directly impede the rotation of the inertia plate. This locking mechanism 50 is more rapid and sensitive than the clutch mechanism 30 in the detection of the rapid deceleration of the vehicle. Therefore, when the belt 1 is rapidly pulled out, the clutch mechanism 30 may be precisely operated thereby to ensure a more reliable locking.

Figure 6A:
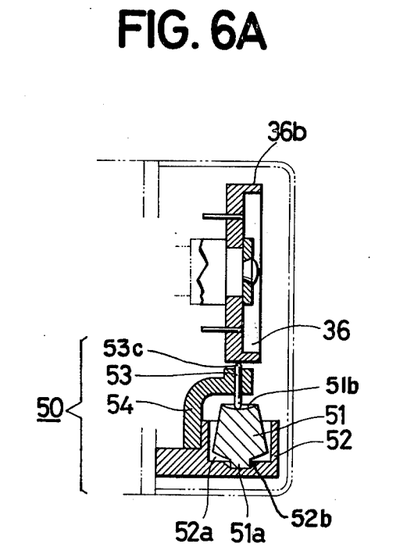
FIG. 6A is a longitudinal cross sectional view of the auxiliary locking mechanism in a first modification.
Figure 6B:
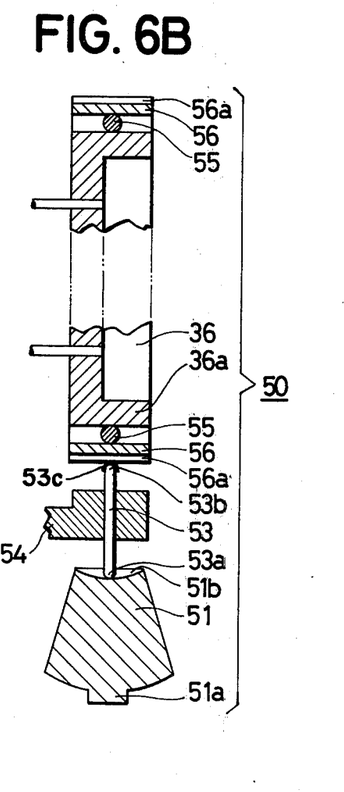
FIG. 6B is a cross sectional view of a second modification of the auxiliary locking mechanism.

For a more effective impeding operation of this mechanism, the top end of the rod-like member 53 and/or the peripheral surface of the inertia plate 36 may be covered with a friction material such as rubber. The friction materials of the member 53 and the inertia plate 36, respectively are designated by reference numerals 53c and 36b in FIG. 6A. Alternately, a ring 56 having teeth 56a for engaging the rod-like member 53 may be fitted around the inertia plate 36 through a frictional member, for example, an O-ring 55, as shown in FIG. 6B. That is, when a torque greater than a predetermined value is developed between the inertia plate 36 and the ring 55, these members slip to undergo relative movement.

Figure 7:
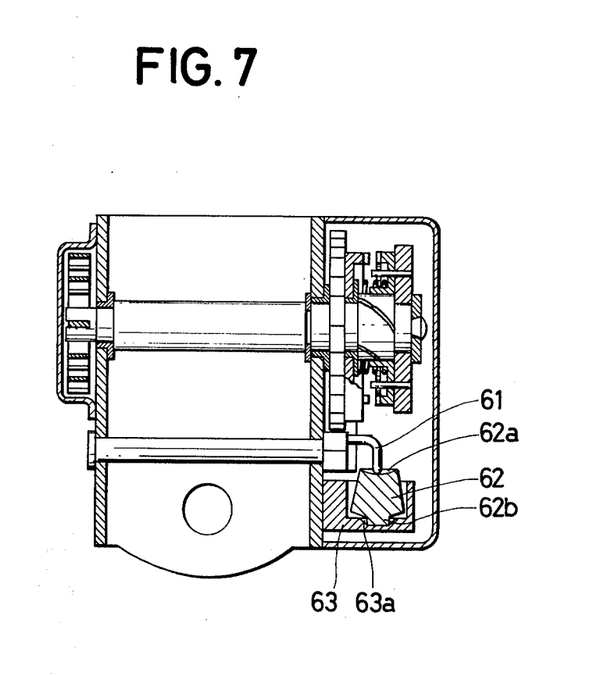
FIG. 7 is a vertical sectional view of still another embodiment of a safety-belt retractor according to the present invention in which another auxiliary locking mechanism is used.
Figure 8:
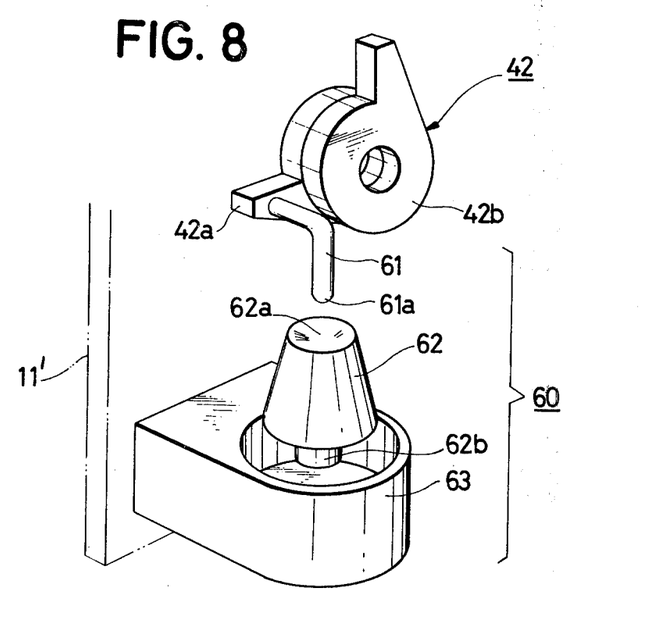
FIG. 8 is a perspective view of the auxiliary locking mechanism.
Figure 9:
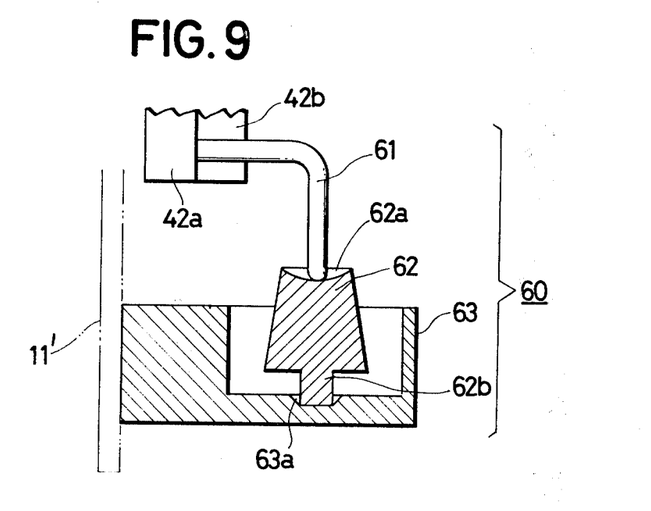
FIG. 9 is a cross sectional view of the auxiliary locking mechanism.

FIG. 7 shows still another embodiment of a safety-belt retractor according to the present invention, in which another locking mechanism 60 is employed, comprising an L-shaped rod-like member 61, an upstanding member 62, and a holder 63. Unlike the embodiment of FIG. 4 the rod-like member 61 is connected to the pawl 42a. The other members are identical in construction and function with FIG. 4. That is, the upstanding member 62 has a curved top end 62a and a projection 62b at the bottom. The stepped bore for movably receiving the upstanding member 62 also is formed in the holder 63 secured to the support wall 11'. In operation, when the vehicle suddenly stops or the vehicle body is inclined, the upstanding member 62 inclines and hence the L-shaped member 61 slides up on the curved surface 62a thereby to move the pawl 42a to engage the teeth 24a of the ratchet wheel 24. This embodiment provides a dual sensitive safety-belt retractor.

What is claimed is:

1. A safety-belt retractor for use in a vehicle, comprising:
   (a) take-up means for taking up a safety-belt and including a frame, a shaft rotatably supported by said frame and biasing means for winding the belt on the shaft;

(b) locking means coupled with said take-up means for selectively locking the same to prevent pulling-out of the safety-belt from the take-up means, said locking means including a first ratchet wheel fixedly mounted on said shaft and a pawl means rotatably mounted on said frame and including first and second pawls angularly disposed at a predetermined angle and connected for common movement, said first pawl being arranged to engage said first ratchet wheel by rotation of said pawl means;

(c) clutch means operatively associated with said locking means for selectively actuating the same to lock the take-up means, said clutch means including a clutch plate rotatably mounted on said shaft and having a periphery provided with a pair of projections which receive said second pawl therebetween, said clutch plate having a side wall with a pair of third pawls thereon, screw means fixedly mounted on said shaft and having an external thread, a second ratchet wheel having an internal thread engaging the external thread of the screw means to advance therealong, said second ratchet wheel having a side wall with laterally projecting teeth thereon facing the third pawls on the side wall of the clutch plate, said second ratchet wheel having at least one hole therein, a spring disposed between said clutch plate and said second ratchet wheel to bias said clutch plate away from said second ratchet wheel; and (d) detector means including an inertia disk rotatably mounted on said shaft, said disk including a rod slidably engaged in said hole in said second ratchet wheel such that in normal operation said inertia disk rotates together with said second ratchet wheel, whereas for rapid pull-out of the belt said inertia disk remains temporaritly at rest so that said second ratchet wheel rotatably advances along said external thread of said screw means towards said clutch plate and away from said inertia disk and said teeth of said second ratchet wheel engage said pair of pawls of said clutch plate to cause the clutch plate to rotate and thereby produce rotation of said pawl means and engagement of said first pawl with said first ratchet wheel.

2. A safety-belt retractor according to claim 1, in which said clutch means further comprises a spacer means between said first ratchet wheel and said screw means rotatably supporting said clutch plate while preventing application of thrust load of said spring against said clutch plate.

3. A safety-belt retractor according to claim 1 comprising means coupled to said frame for applying a braking force on said inertia disk upon inclination or acceleration of said frame or vehicle.

4. A safety-belt retractor according to claim 1 comprising means coupled to said frame and engaged with said second pawl of said pawl means for applying force thereto to turn said pawl means and engage said first pawl with said first ratchet wheel upon inclination or acceleration of said frame or vehicle whereby to supplement the action of the inertia disk in effecting engagement of said first pawl with said first ratchet wheel.

5. A safety-belt retractor for use in a vehicle, comprising:

(a) take-up means for taking up a safety-belt and including a frame, a shaft rotatably supported by said frame and biasing means for winding the belt on the shaft;

(b) locking means coupled with said take-up means for selectively locking the same to prevent pulling-out of the safety-belt from the take-up means, said locking means including a first ratchet wheel fixedly mounted on said shaft and a pawl means rotatably mounted on said frame and including first and second pawls angularly disposed at a predetermined angle and connected for common movement, said first pawl being arranged to engage said first ratchet wheel by rotation of said pawl means;

(c) clutch means operatively associated with said locking means for selectively actuating the same to lock the take-up means, said clutch means including a clutch plate rotatably mounted on said shaft and having a periphery provided with a pair of projections which receive said second pawl therebetween, said clutch plate having a side wall with a pair of third pawls thereon, screw means fixedly mounted on said shaft and having an external thread, a second ratchet wheel having an internal thread engaging the external thread of the screw means to advance therealong, said second ratchet wheel having a side wall with laterally projecting teeth thereon facing the third pawls on the side wall of the clutch plate, said second ratchet wheel having at least one hole therein, a spring disposed between said clutch plate and said second ratchet wheel to bias said clutch plate away from said second ratchet wheel;

(d) detector means including an inertia disk rotatably mounted on said shaft, said disk including a rod slidably engaged in said hole in said second ratchet wheel such that in normal operation said inertia disk rotates together with said second ratchet wheel, whereas for rapid pull-out of the belt said inertia disk remains temporarily at rest so that said second ratchet wheel rotatably advances along said external thread of said screw means towards said clutch plate and away from said inertia disk and said teeth of said second ratchet wheel engage said pair of pawls of said clutch plate to cause the clutch plate to rotate and thereby produce rotation of said pawl means and engagement of said first pawl with said first ratchet wheel; and (e) an upstanding member fixed to said frame and undergoing tilting movement when the speed of the vehicle changes rapidly or the vehicle inclines, said upstanding member being cone-shaped in longitudinal section and having a curved upper surface and a projection at the bottom, a rod member having one end slidably contacting said curved upper surface of said upstanding member and a second end in contact with said inertia disk such that if said upstanding member undergoes tilting said rod member presses against said inertia disk with increased intensity and a fixed holder on said frame holding said upstanding member, said holder having a recess loosely receiving said projection.

6. A safety-belt according to claim 5 in which said inertia disk is provided with frictional material on the peripheral surface thereof.

7. A safety-belt according to claim 6 in which said rod member is provided with further frictional material on the end thereof in contact with the first said frictional material on the peripheral surface of said inertia disk.

8. A safety-belt retractor for use in a vehicle comprising:
- (a) take-up means for taking up a safety-belt and including a frame, a shaft rotatably supported by said frame and biasing means for winding the belt on the shaft;
- (b) locking means coupled with said take-up means for selectively locking the same to prevent pulling-out of the safety-belt from the take-up means, said locking means including a first ratchet wheel fixedly mounted on said shaft and a pawl means rotatably mounted on said frame and including first and second pawls angularly disposed at a predetermined angle and connected for common movement, said first pawl being arranged to engage said first ratchet wheel by rotation of said pawl means;
- (c) clutch means operatively associated with said locking means for selectively actuating the same to lock the take-up means, said clutch means including a clutch plate rotatably mounted on said shaft and having a periphery provided with a pair of projections which receive said second pawl therebetween, said clutch plate having a side wall with a pair of third pawls thereon, screw means fixedly mounted on said shaft and having an external thread, a second ratchet wheel having an internal thread engaging the external thread of the screw means to advance therealong, said second ratchet wheel having a side wall with laterally projecting teeth thereon facing the third pawls on the side wall of the clutch plate, said second ratchet wheel having at least one hole therein, a spring disposed between said clutch plate and said second ratchet wheel to bias said clutch plate away from said second ratchet wheel;
- (d) detector means including an inertia disk rotatably mounted on said shaft, said disk including a rod slidably engaged in said hole in said second ratchet wheel such that in normal operation said inertia disk rotates together with said second ratchet wheel, whereas for rapid pull-out of the belt said inertia disk remains temporarily at rest so that said second ratchet wheel rotatably advances along said external thread of said screw means towards said clutch plate and away from said inertia disk and said teeth of said second ratchet wheel engage said pair of pawls of said clutch plate to cause the clutch plate to rotate and thereby produce rotation of said pawl means and engagement of said first pawl with said first ratchet wheel; and
- (e) an upstanding member fixed to said frame and undergoing tilting movement when the speed of the vehicle changes rapidly or the vehicle inclines, said upstanding member being cone-shaped in longitudinal section and having a curved upper surface and a projection at the bottom, and an L-shaped member fixed to said second pawl of said pawl means and including a leg slidably contacting said curved upper surface of said upstanding member such that if said upstanding member undergoes tilting movement of a predetermined magnitude said pawl means is rotated and said first pawl is engaged with said first ratchet wheel.

* * * * *